(12) United States Patent
Biskeborn et al.

(10) Patent No.: US 8,310,784 B2
(45) Date of Patent: Nov. 13, 2012

(54) TANDEM MAGNETIC WRITER WITH INDEPENDENTLY ADDRESSABLE COILS

(75) Inventors: Robert G. Biskeborn, Hollister, CA (US); Philipp Herget, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 1183 days.

(21) Appl. No.: 12/141,375

(22) Filed: Jun. 18, 2008

(65) Prior Publication Data
US 2009/0316291 A1    Dec. 24, 2009

(51) Int. Cl.
*G11B 5/17* (2006.01)
*G11B 5/29* (2006.01)

(52) U.S. Cl. ............... 360/123.17; 360/121; 360/125.34

(58) Field of Classification Search .................. 360/121, 360/123.17, 123.11, 123.18, 123.19, 125.34
See application file for complete search history.

(56) References Cited

U.S. PATENT DOCUMENTS

| | | | |
|---|---|---|---|
| 4,176,381 A | 11/1979 | de Niet et al. | 360/77 |
| 4,408,240 A | 10/1983 | Pastore | 360/121 |
| 4,975,791 A | 12/1990 | Eggebeen | 360/77.01 |
| 4,979,051 A | 12/1990 | Eggebeen | 360/21 |
| 5,294,803 A | 3/1994 | Pahr | 250/561 |
| 5,600,505 A | 2/1997 | Ayres | 360/77.12 |
| 5,689,384 A | 11/1997 | Albrecht et al. | 360/77.12 |
| 6,021,013 A | 2/2000 | Albrecht et al. | 360/53 |
| 6,282,051 B1 | 8/2001 | Albrecht et al. | 360/75 |
| 6,288,870 B1 * | 9/2001 | Saliba | 360/121 |
| 6,417,729 B1 * | 7/2002 | Lemay et al. | 330/129 |
| 6,542,325 B1 | 4/2003 | Molstad et al. | 360/77.12 |
| 6,700,729 B1 * | 3/2004 | Beck et al. | 360/76 |
| 6,879,457 B2 | 4/2005 | Eaton et al. | 360/75 |
| 6,943,979 B2 | 9/2005 | Goker et al. | 360/77.12 |
| 7,072,133 B1 * | 7/2006 | Yip et al. | 360/53 |
| 7,119,976 B2 | 10/2006 | Biskeborn et al. | 360/53 |
| 7,136,255 B2 | 11/2006 | Mahnad et al. | 360/77.12 |
| 7,149,050 B2 | 12/2006 | Saliba et al. | 360/77.12 |
| 7,184,233 B2 | 2/2007 | Zweighaft | 360/51 |
| 7,322,096 B2 | 1/2008 | Biskeborn et al. | 29/603.16 |
| 7,379,258 B2 | 5/2008 | Nakao et al. | 360/75 |
| 7,450,341 B2 * | 11/2008 | Dugas et al. | 360/121 |

(Continued)

OTHER PUBLICATIONS

Examiner's Answer from U.S. Appl. No. 12/141,363 dated Mar. 21, 2011.

(Continued)

*Primary Examiner* — Jefferson Evans
(74) *Attorney, Agent, or Firm* — Zilka-Kotab, PC

(57) ABSTRACT

A magnetic head in one embodiment comprises a pole; a first write gap in the pole; a first coil for generating a magnetic flux across the first write gap; a second write gap in the pole having at least a portion thereof aligned with the first write gap in a direction parallel to a direction of media travel thereover; and a second coil for generating a magnetic flux across the second write gap, the second coil being addressable independently of the first coil. A method in one embodiment comprises forming a first write coil; forming a first write gap; forming a second write gap having at least a portion thereof aligned with the first write gap in a direction parallel to a direction of media travel thereover; forming a second coil for generating a magnetic flux across the second write gap, the second coil being addressable independently of the first coil; and forming one or more write poles, wherein a write pole region adjacent the first and second write gaps is formed concurrently.

16 Claims, 9 Drawing Sheets

U.S. PATENT DOCUMENTS

| | | | |
|---|---|---|---|
| 7,570,450 B2 * | 8/2009 | Koeppe | 360/75 |
| 7,839,605 B2 * | 11/2010 | Parker | 360/318 |
| 2002/0186497 A1 | 12/2002 | Nakao et al. | 360/77.13 |
| 2005/0234483 A1 | 10/2005 | Yencho et al. | 606/153 |
| 2006/0291090 A1 * | 12/2006 | Dugas et al. | 360/77.12 |
| 2007/0047146 A1 | 3/2007 | Biskeborn et al. | 360/240 |
| 2007/0121240 A1 | 5/2007 | Duran | 360/75 |
| 2008/0239559 A1 | 10/2008 | Goker et al. | 360/77.12 |

OTHER PUBLICATIONS

Final Office Action Summary from U.S. Appl. No. 12/141,363 mailed on May 21, 2010.

Office Action Summary from U.S. Appl. No. 12/141,363 mailed on Feb. 26, 2010.

U.S. Appl. No. 12/141,363, filed Jun. 18, 2008.

* cited by examiner

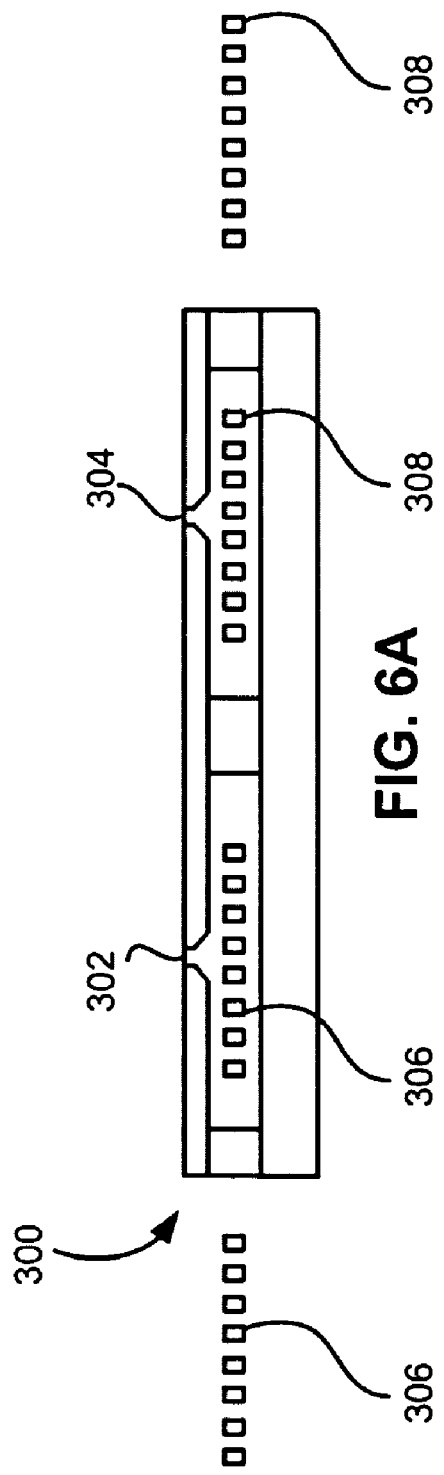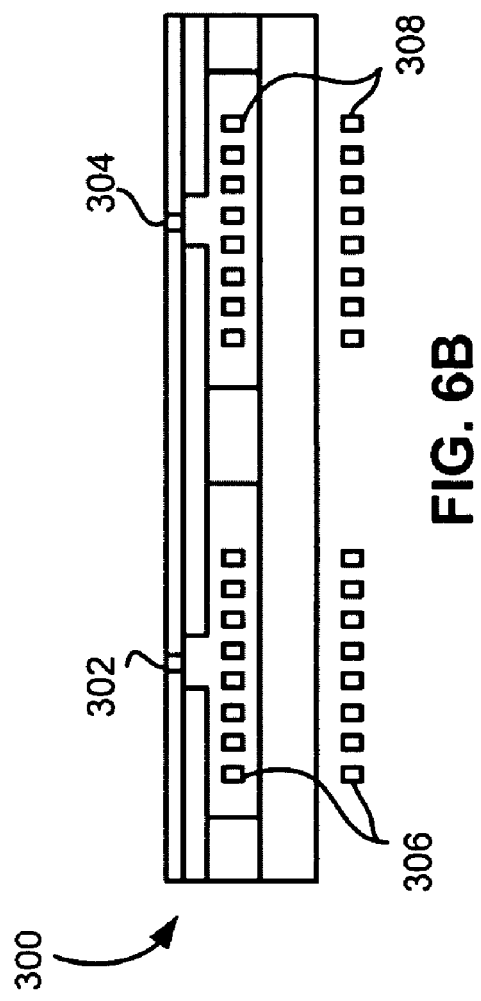

TANDEM MAGNETIC WRITER WITH INDEPENDENTLY ADDRESSABLE COILS

BACKGROUND

The present invention relates to data storage systems, and more particularly, this invention relates to writers.

In magnetic storage systems, data is read from and written onto magnetic recording media utilizing magnetic transducers commonly. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has lead to increasing the track density on recording tape, and decreasing the thickness of the magnetic tape medium. However, the development of small footprint, higher performance tape drive systems has created various problems in the design of a tape head assembly for use in such systems.

SUMMARY

A magnetic head in one embodiment comprises a pole; a first write gap in the pole; a first coil for generating a magnetic flux across the first write gap; a second write gap in the pole having at least a portion thereof aligned with the first write gap in a direction parallel to a direction of media travel thereover; and a second coil for generating a magnetic flux across the second write gap, the second coil being addressable independently of the first coil.

A system in one embodiment comprises a first write gap; a first coil for generating a magnetic flux across the first write gap; a second write gap formed on a common substrate with the first write head and having at least a portion thereof aligned with the first write gap in a direction parallel to a direction of media travel thereover; a second coil for generating a magnetic flux across the second write gap, the second coil being addressable independently of the first coil; the first and second write gaps having about a same track width.

A system in yet another embodiment comprises a planar tape bearing surface; a first write gap positioned such that a magnetic flux emanates thereacross out of the tape bearing surface; a first coil for generating the magnetic flux across the first write gap; a second write gap positioned such that a magnetic flux emanates thereacross out of the tape bearing surface, the second write gap having at least a portion thereof aligned with the first write gap in a direction parallel to a direction of media travel thereover; and a second coil for generating the magnetic flux across the second write gap, the second coil being addressable independently of the first coil; the first and second write gaps being oriented at an angle relative to each other of greater than 0 degrees and less than 180 degrees.

A method in one embodiment comprises forming a first write coil; forming a first write gap; forming a second write gap having at least a portion thereof aligned with the first write gap in a direction parallel to a direction of media travel thereover; forming a second coil for generating a magnetic flux across the second write gap, the second coil being addressable independently of the first coil; and forming one or more write poles, wherein a write pole region adjacent the first and second write gaps is formed concurrently.

Any of these embodiments may be implemented in a magnetic data storage system such as a tape drive system, which may include a magnetic head as recited above, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

FIG. 6A is a cross sectional view of FIG. 5 taken along Line 6-6 of FIG. 5.

FIG. 6B is a cross sectional view of a tandem head according to one embodiment.

DETAILED DESCRIPTION

Figure 1:
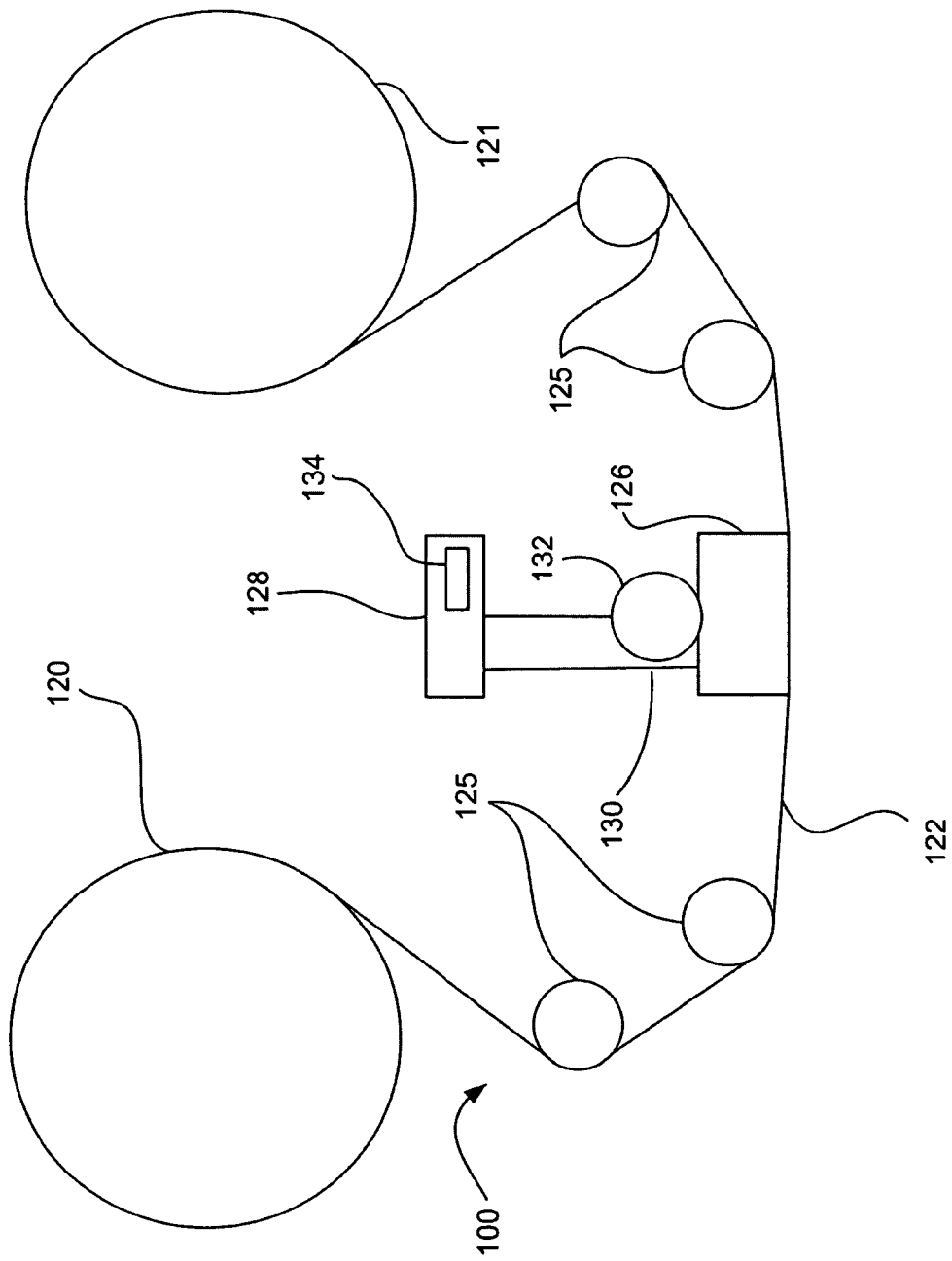
FIG. 1 is a schematic diagram of a simplified tape drive system according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of tape-based storage systems, as well as operation and/or component parts thereof.

In one general embodiment, a magnetic head comprises a pole; a first write gap in the pole; a first coil for generating a magnetic flux across the first write gap; a second write gap in the pole having at least a portion thereof aligned with the first write gap in a direction parallel to a direction of media travel thereover; and a second coil for generating a magnetic flux across the second write gap, the second coil being addressable independently of the first coil.

In another general embodiment, a system comprises a first write gap; a first coil for generating a magnetic flux across the first write gap; a second write gap formed on a common substrate with the first write head and having at least a portion thereof aligned with the first write gap in a direction parallel to a direction of media travel thereover; a second coil for generating a magnetic flux across the second write gap, the second coil being addressable independently of the first coil; the first and second write gaps having about a same track width.

In another general embodiment, a system comprises a planar tape bearing surface; a first write gap positioned such that a magnetic flux emanates thereacross out of the tape bearing surface; a first coil for generating the magnetic flux across the first write gap; a second write gap positioned such that a magnetic flux emanates thereacross out of the tape bearing surface, the second write gap having at least a portion thereof aligned with the first write gap in a direction parallel to a direction of media travel thereover; and a second coil for generating the magnetic flux across the second write gap, the second coil being addressable independently of the first coil; the first and second write gaps being oriented at an angle relative to each other of greater than 0 degrees and less than 180 degrees.

In another general embodiment, a method comprises forming a first write coil; forming a first write gap; forming a second write gap having at least a portion thereof aligned with the first write gap in a direction parallel to a direction of media travel thereover; forming a second coil for generating a magnetic flux across the second write gap, the second coil being addressable independently of the first coil; and forming one or more write poles, wherein a write pole region adjacent the first and second write gaps is formed concurrently.

FIG. 1 illustrates a simplified tape drive 100 of a tape-based data storage system, which may be employed in the context of the present invention. While one specific implementation of a tape drive is shown in FIG. 1, it should be noted that the embodiments described herein may be implemented in the context of any type of tape drive system.

As shown, a tape supply cartridge 120 and a take-up reel 121 are provided to support a tape 122. One or more of the reels may form part of a removable cassette and are not necessarily part of the system 100. The tape drive, such as that illustrated in FIG. 1, may further include drive motor(s) to drive the tape supply cartridge 120 and the take-up reel 121 to move the tape 122 over a tape head 126 of any type.

Guides 125 guide the tape 122 across the tape head 126. Such tape head 126 is in turn coupled to a controller assembly 128 via a cable 130. The controller 128 typically controls head functions such as servo following, writing, reading, etc. The cable 130 may include read/write circuits to transmit data to the head 126 to be recorded on the tape 122 and to receive data read by the head 126 from the tape 122. An actuator 132 controls position of the head 126 relative to the tape 122.

An interface may also be provided for communication between the tape drive and a host (integral or external) to send and receive the data and for controlling the operation of the tape drive and communicating the status of the tape drive to the host, all as will be understood by those of skill in the art.

Figure 2:
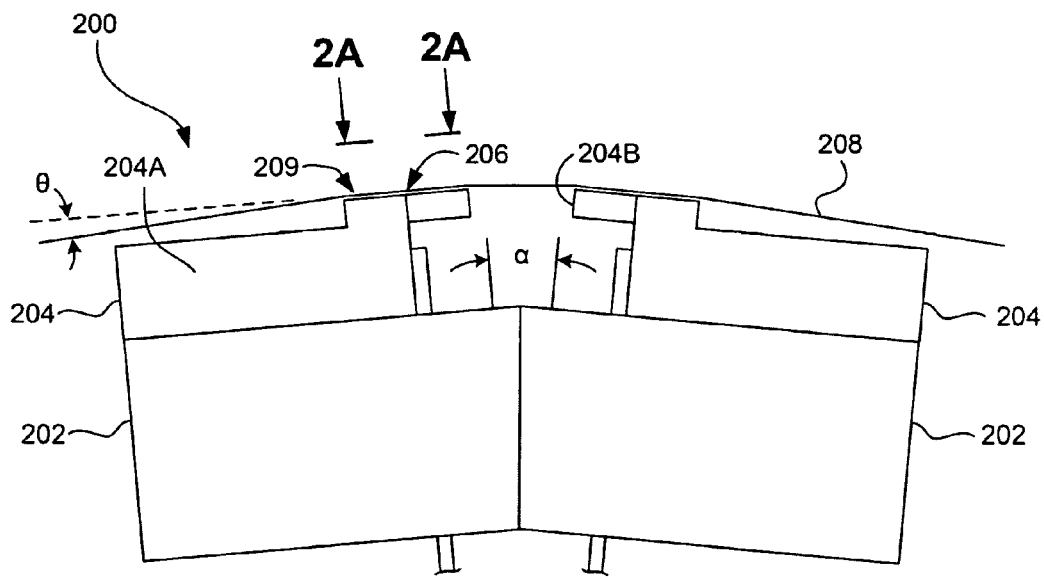
FIG. 2 illustrates a side view of a flat-lapped, bi-directional, two-module magnetic tape head according to one embodiment.

By way of example, FIG. 2 illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases are typically "U-beams" that are adhesively coupled together. Each module 204 includes a substrate 204A and a closure 204B with a gap 206 comprising readers and/or writers situated therebetween. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between ⅛ degree and 4½ degrees.

The substrates 204A are typically constructed of a wear resistant material, such as a ceramic. The closures 204B made of the same or similar ceramic as the substrates 204A.

The readers and writers may be arranged in a piggyback configuration. The readers and writers may also be arranged in an interleaved configuration. Alternatively, each array of channels may be readers or writers only. Any of these arrays may contain one or more servo readers.

Figure 2A:
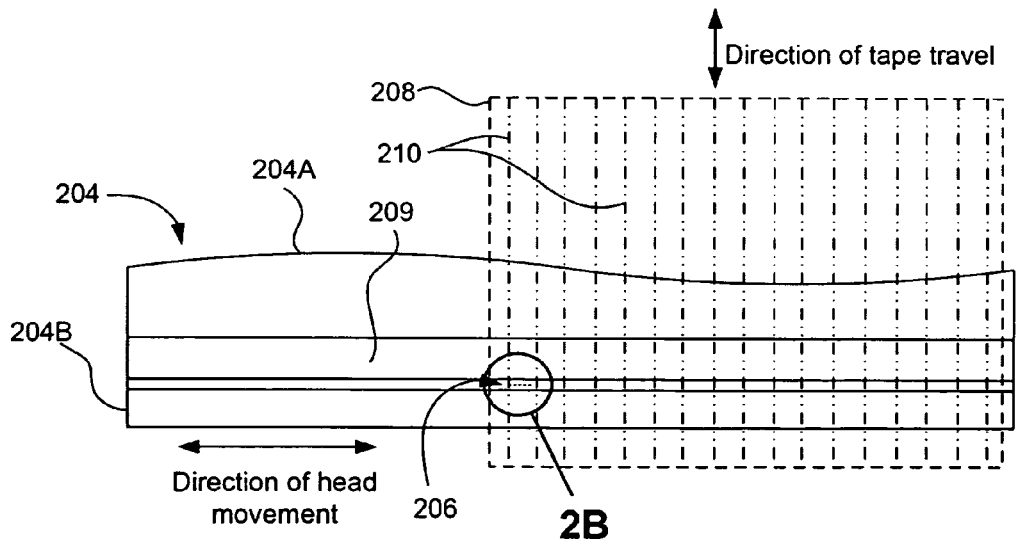
FIG. 2A is a tape bearing surface view taken from Line 2A of FIG. 2.

FIG. 2A illustrates the tape bearing surface 209 of one of the modules 204 taken from Line 2A of FIG. 2. A representative tape 208 is shown in dashed lines. The module 204 is preferably long enough to be able to support the tape as the head steps between data bands.

In this example, the tape 208 includes 4-22 data bands, e.g., with 16 data bands and 17 servo tracks 210, as shown in FIG. 2A on a one-half inch wide tape 208. The data bands are defined between servo tracks 210. Each data band may include a number of data tracks, for example 96 data tracks (not shown). During read/write operations, the elements 206 are positioned within one of the data bands. Outer readers, sometimes called servo readers, read the servo tracks 210. The servo signals are in turn used to keep the elements 206 aligned with a particular track during the read/write operations.

Figure 2B:
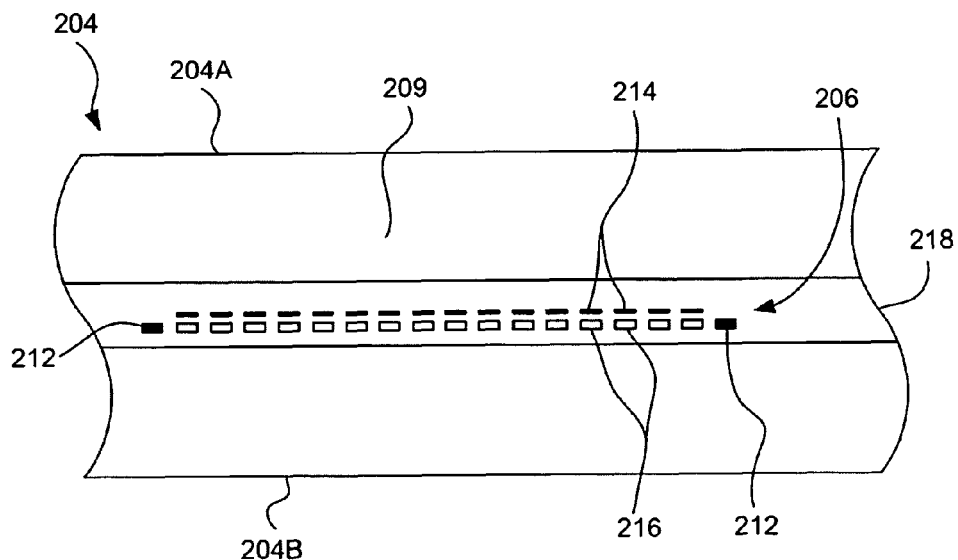
FIG. 2B is a detailed view taken from Circle 2B of FIG. 2A.

FIG. 2B depicts a plurality of read and/or write elements 206 formed in a gap 218 on the module 204 in Circle 2B of FIG. 2A. As shown, the array of elements 206 includes, for example, 16 writers 214, 16 readers 216 and two servo readers 212, though the number of elements may vary. Illustrative embodiments include 8, 16, 32, and 64 elements per array 206. A preferred embodiment includes 32 readers per array and/or 32 writers per array. This allows the tape to travel more slowly, thereby reducing speed-induced tracking and mechanical difficulties. While the readers and writers may be arranged in a piggyback configuration as shown in FIG. 2B, the readers 216 and writers 214 may also be arranged in an interleaved configuration. Alternatively, each array of elements 206 may be readers or writers only, and the arrays may contain one or more servo readers 212. As noted by considering FIGS. 2 and 2A-B together, each module 204 may include a complementary set of elements 206 for such things as bi-directional reading and writing, read-while-write capability, backward compatibility, etc.

Figure 2C:
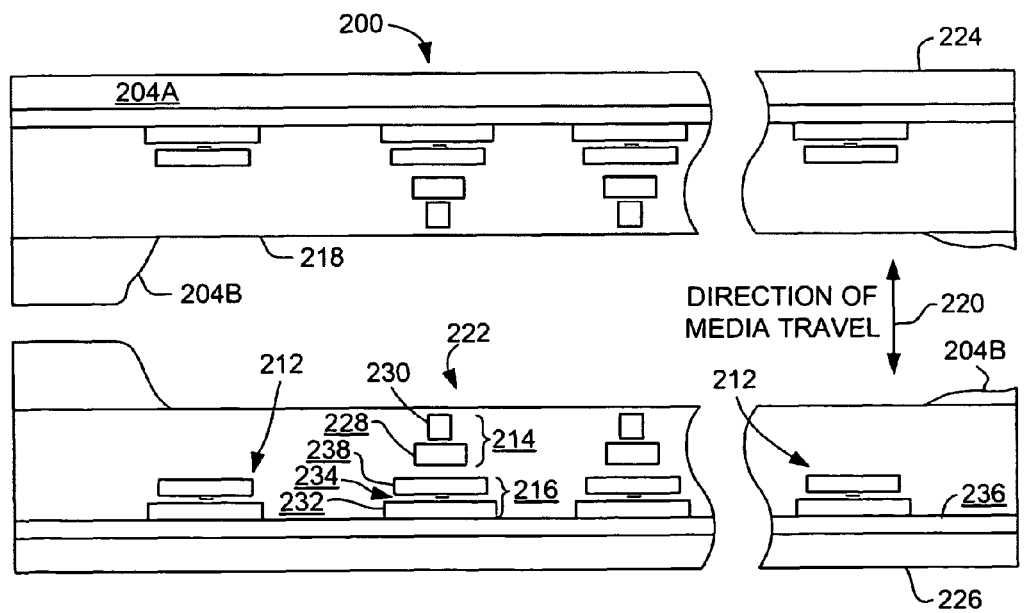
FIG. 2C is a detailed view of a partial tape bearing surface of a pair of modules.

FIG. 2C shows a partial tape bearing surface view of complimentary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write head 214 and the readers, exemplified by the read head 216, are aligned parallel to a direction of travel of a tape medium thereacross to form an R/W pair, exemplified by the R/W pair 222.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked MR head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (permalloy), CZT or Al—Fe—Si (Sendust), a sensor 234 for sensing a data track on a magnetic medium, a second shield 238 typically of a nickel-iron alloy (e.g., 80/20 Permalloy), first and second writer pole tips 228, 230, and a coil (not shown).

The first and second writer poles 228, 230 may be fabricated from high magnetic moment materials such as 45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

In particularly preferred embodiments, a head includes two or more independently addressable write gaps, where the gaps generally lie along a line oriented parallel to a direction of tape travel thereacross. While such heads may be used for any type of recording, including data recording, the heads are especially useful for writing servo patterns to a magnetic medium such as a tape.

Magnetic tape uses a written servo pattern to indicate the lateral position on tape. This servo pattern is used to indicate the lateral position, on tape, of the various written tracks. The servo pattern is not perfect due to variations in tape velocity and lateral tape motion in the servo writer system during servo writing. The component of the servo pattern due to the velocity variations and lateral motion is termed the 'written in' component and interferes with capabilities of the track following actuator in the drive. For example, components of the 'written in' servo can be incorrectly interpreted by the track following actuator as lateral positioning error and so cause the head to move in response thus resulting in mistracking. Greater track following accuracy becomes more important as written tracks get narrower. Hence 'written in' servo noise limits the ultimate track pitch attainable in magnetic tape recording.

In use, some of the embodiments described herein may be used as a servo writer using methods such as those described in U.S. patent application Ser. No. 12/141,363 to Biskeborm et al., having title "Systems and Methods for Writing Servo Patterns," filed concurrently herewith, and which is herein incorporated by reference.

Figure 3:
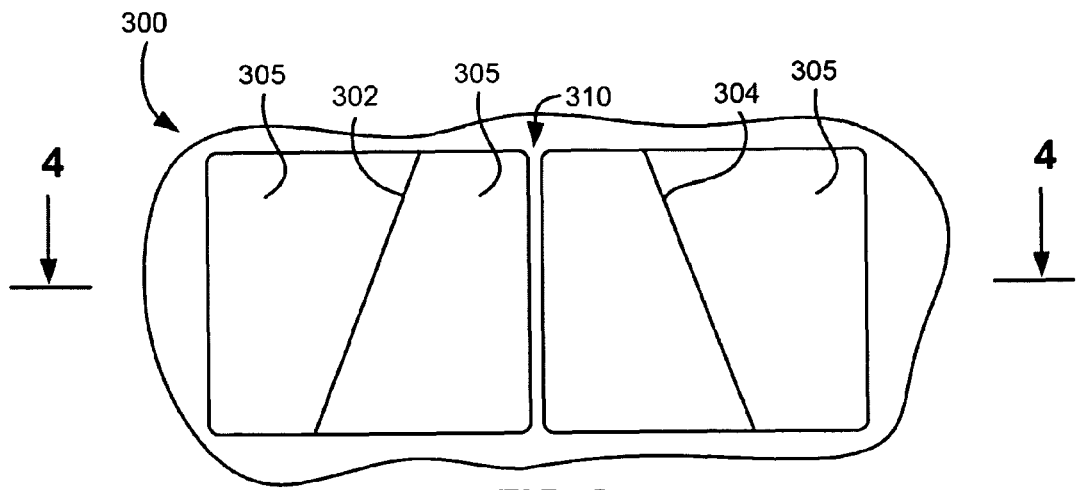
FIG. 3 is a partial tape bearing surface of a tandem head according to one embodiment.
Figure 4:
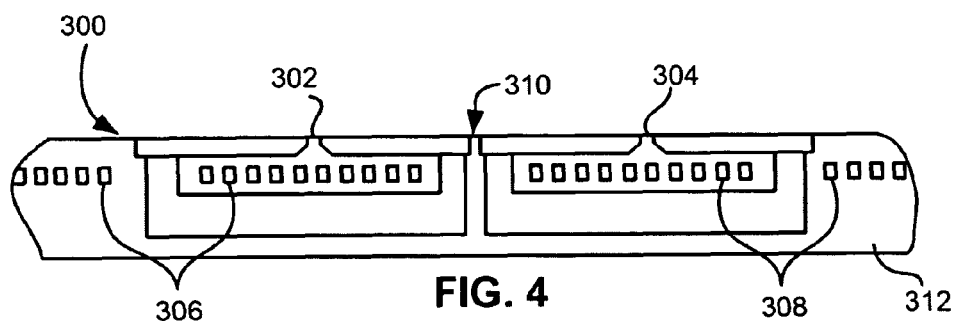
FIG. 4 is a cross sectional view of FIG. 3 taken along Line 4-4 of FIG. 3.

In one general approach, tandem heads include a first write gap, a first coil for generating a magnetic flux across the first write gap, a second write gap having at least a portion thereof aligned with the first write gap in a direction parallel to a direction of media travel thereover, and a second coil for generating a magnetic flux across the second write gap, the second coil being addressable independently of the first coil;

FIG. 3 illustrates a tandem head 300 according to one embodiment. FIG. 4 shows a cross section of FIG. 3 taken along Line 4-4. As shown, the tandem head 300 has a pole 305 with first and second write gaps 302, 304 therein, and independently addressable first and second coils 306, 308. The first coil 306 is operative to cause a magnetic flux to emanate from the first gap 302. The second coil 308 is operative to cause a magnetic flux to emanate from gap 304.

As noted below, the write gaps 302, 304 in this and other embodiments may be concurrently formed. This has the advantage of allowing precise alignment of the write gaps. Also, the various regions of the pole 305 may be concurrently formed in this and other embodiments.

Figure 5:
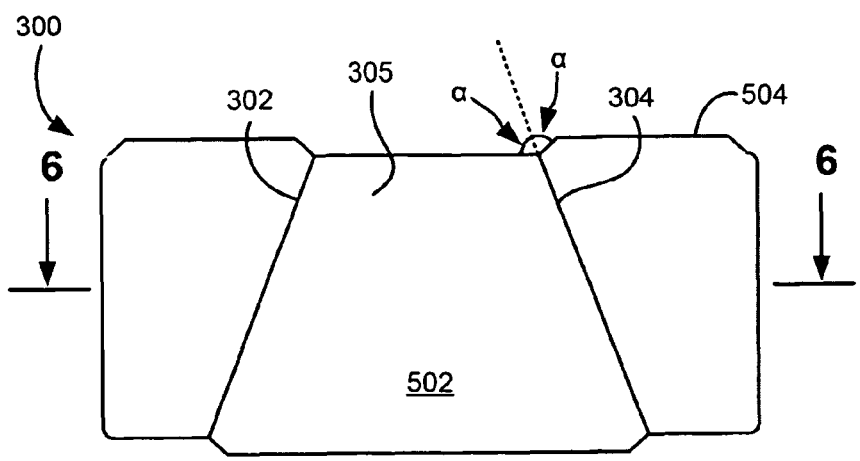
FIG. 5 is a partial tape bearing surface of a tandem head according to one embodiment.

FIG. 5 illustrates a tandem head 300 having two write gaps 302, 304 and independently addressable coils 306, 308. Coil 306 is operative to cause a magnetic flux to emanate from gap 302. Coil 308 is operative to cause a magnetic flux to emanate from gap 304.

As also shown in FIG. 5, wing portions 504 may be added to this and other embodiments to reduce the possibility of saturation at the ends of the gaps. Preferably, the angles α of the wing portion and central region 502 of the pole 305 relative to an imaginary line coaxial extending along the gap are about the same.

FIG. 6A shows a cross section of FIG. 5 taken along Line 6-6, with external coil wraps shown. As shown, the tandem head 300 has first and second write gaps 302, 304 and independently addressable first and second coils 306, 308 configured in a pancake configuration.

FIG. 6B shows an alternate embodiment of a tandem head 300 having first and second write gaps 302, 304 and independently addressable first and second coils 306, 308 configured in a helical configuration. Also, the top pole includes multiple layers in this embodiment.

In some embodiments, such as the embodiment shown in FIG. 4, the tape bearing surface of the head is planar. In other embodiments, the tape head may be curved, arcuate, semicylindrical, etc.

In some embodiments, as exemplified by FIGS. 3-4, tandem heads 300 may be fabricated with a space 310 separating the segments. The space may be a void or filled, e.g., formed of a nonmagnetic material, etc. Also, as shown in FIG. 4, the segments may be formed on some base material 312, which may comprise a wafer and insulating layer.

In other embodiments, as exemplified by FIGS. 5-6, tandem heads 300 may share a common pole region 502.

The materials used to construct the tandem writers described herein may be conventional writer materials, and/or specialty materials. In preferred approaches, the yoke portions of the writers are constructed of a high magnetic permeability material such as permalloy (80/20 NiFe), etc. The portions of the write pole regions at least near the write gaps are preferably constructed of a high magnetic saturation (e.g., high $B_S$) material such as alloys of iron with Ni, Co, and/or Al, etc. One illustrative material is 45/55 NiFe.

As exemplified in FIG. 6A, the upper pole regions may be tapered near the write gaps. This tapering focuses the fringing fields at the write gap, improving writing efficacy. In a variation, exemplified by FIG. 6B, the top pole may be or include a second layer.

Figure 7:
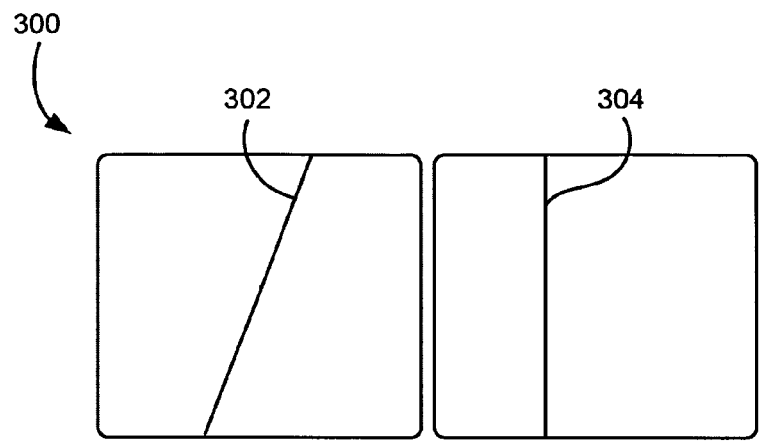
FIG. 7 is a partial tape bearing surface of a tandem head according to one embodiment.

As evident from FIGS. 3 and 5, the first and second write gaps may be oriented at an angle relative to each other of greater than 0 and less than 180 degrees. For example, the write gaps may be oriented between about 1 and about 179 degrees, between about 5 and about 175 degrees relative to each other, or any subrange between 0 and 180 degrees Accordingly, because of the angling, controlled firing of each of the write gaps may be used to form the distinctive carat, N, M, etc. magnetic patterns in a servo or data track. See, e.g., FIG. 7, showing a tandem head 300 having a first gap 304 oriented about perpendicular to the direction of tape travel and a second gap 302 oriented at an angle relative to the first gap 304 of greater than 0 and less than 180 degrees. In another illustrative approach, the first write gap is oriented at an angle of between about 2 and about 88 relative to the direction of media travel thereover, while the second write gap may also be oriented at an angle of between about 2 and about 88 (which is intended to encompass between about −2 and about −88 degrees) relative to the direction of media travel thereover.

Figure 11:
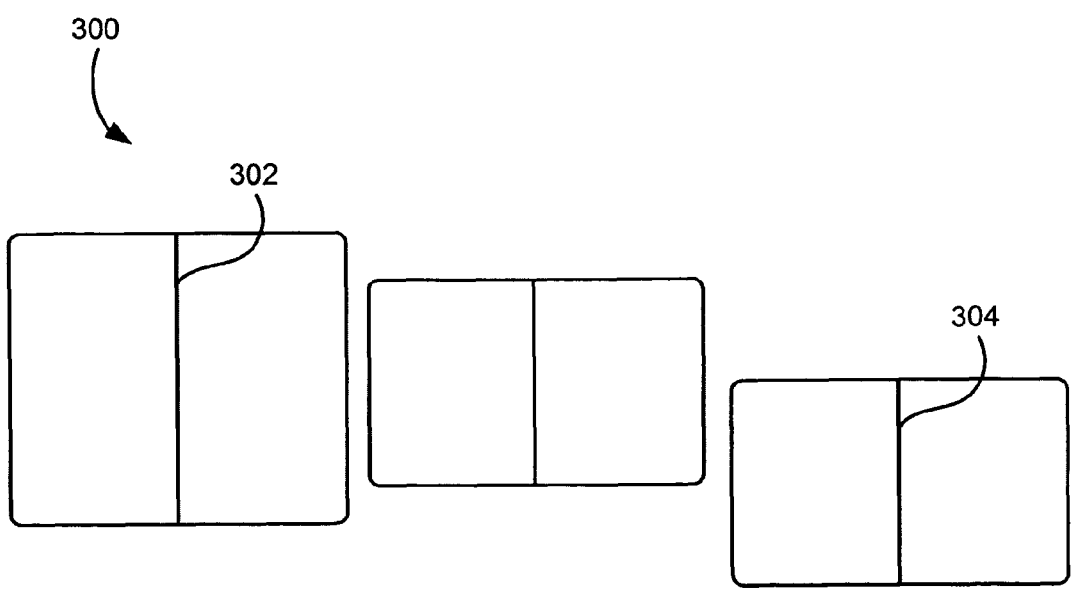
FIG. 11 is a partial tape bearing surface of a tandem head according to one embodiment.

In other embodiments, the gaps may be oriented for writing data, such as conventional or azimuthal data recording. In one approach (e.g., as in FIG. 11), some of the write gaps may be oriented about parallel to each other and may be used for DC erasing tape.

Figure 8:
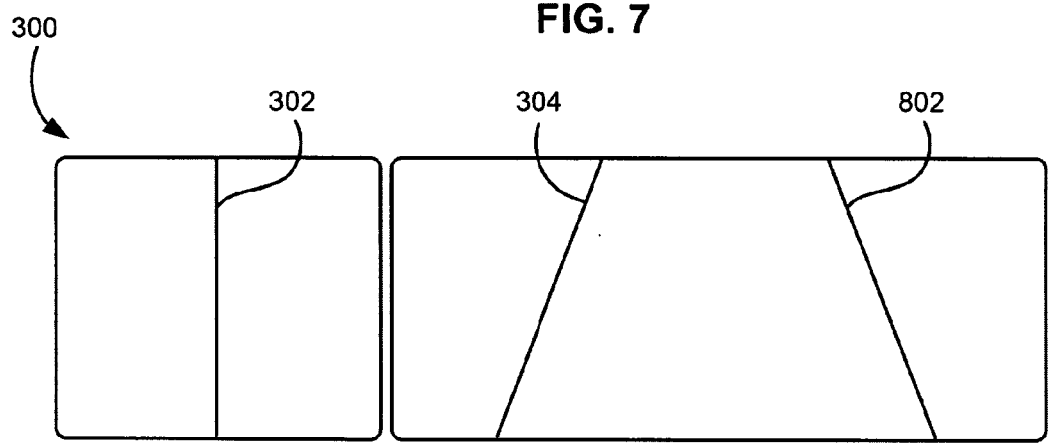
FIG. 8 is a partial tape bearing surface of a tandem head according to one embodiment.

In other embodiments, each segment may contain at least one write gap. For example, as exemplified by FIG. 8, one approach may have one write gap 302 in a first segment, and two write gaps 304, 802 in a second segment. Such a writer may be particularly useful where gap 302 is used to erase a data track on a tape, while gaps 304, 802 write a servo or data pattern. Note that each of the gaps 302, 304, 802 may be independently addressable, or some may share a coil, as discussed below. In another example, the head may have two or more write gaps in each segment. See, e.g., FIG. 12, discussed below.

In further embodiments, more than two segments may be present, each with one or more independently addressable write gaps, oriented in any orientation. See, e.g., FIG. 9, depicting a tandem head 300 with three segments, each having a write gap 302, 304, 902.

Figure 9:
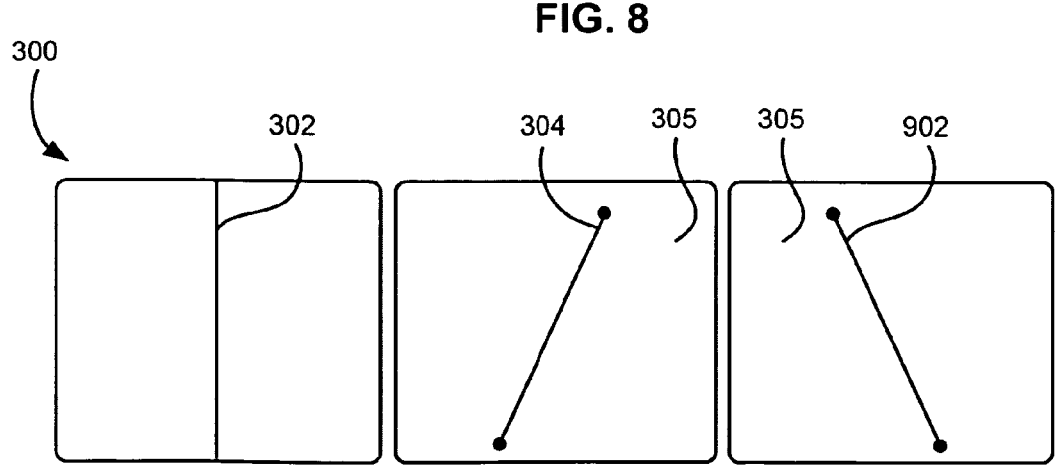
FIG. 9 is a partial tape bearing surface of a tandem head according to one embodiment.

FIG. 9 also illustrates that the gaps in this or any other embodiment do not need to extend to the ends of the pole. As shown, the gaps may be positioned in the face of the upper pole. Optional bulbous ends on the gaps improve the uniformity of the flux along the gap.

Figure 10:
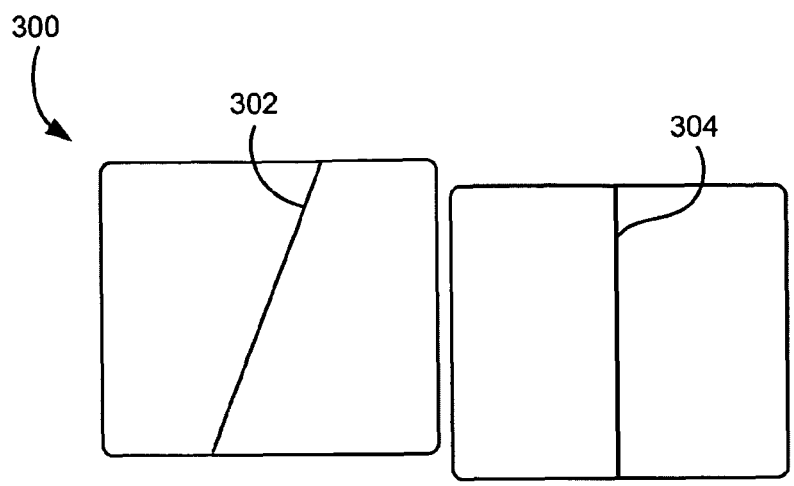
FIG. 10 is a partial tape bearing surface of a tandem head according to one embodiment.

The examples of FIGS. 5-9 show embodiments where centers of the gaps generally lie along a line oriented parallel to a direction of tape travel thereacross, e.g., are centered on the line. However, in other embodiments, exemplified by FIGS. 10 and 11, the write gaps 302, 304 have offset centers relative to the direction of tape travel thereacross.

In some embodiments, the first and second write gaps may have about a same track width. In further embodiments, the first and second write gaps have different track widths. See, e.g., FIG. 11.

Figure 12:
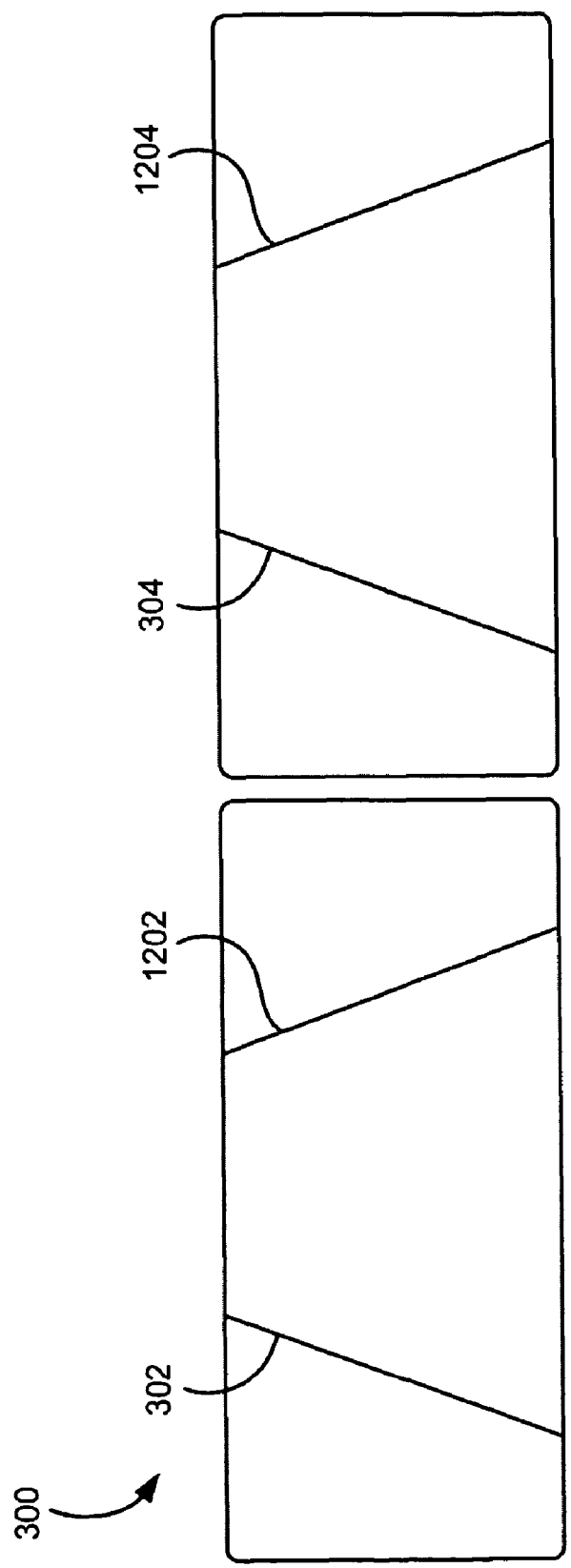
FIG. 12 is a partial tape bearing surface of a tandem head according to one embodiment.

In further embodiments, one or more segments may include multiple write gaps that are addressed by the same coil. For example, FIG. 12 illustrates an embodiment 300 having pairs 302 and 1202, 304 and 1204, of write gaps that share a coil, where each coil, and thus each pair of write gaps, is independently addressable. See also FIG. 8, where gap 302 may be addressed independently of gaps 304 and 802.

Note also that the gaps need not be centrally located on a given pole region. Rather, it may be desirable for asymmetric placement of a gap in some embodiments. See, e.g., FIG. 7.

Figure 13A:
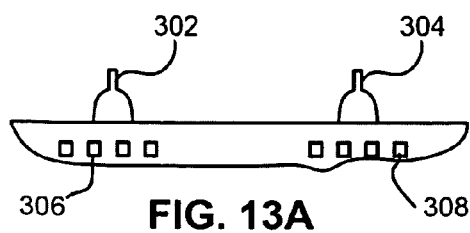
FIGS. 13A-C illustrate one method for forming a writer.
Figure 13B:
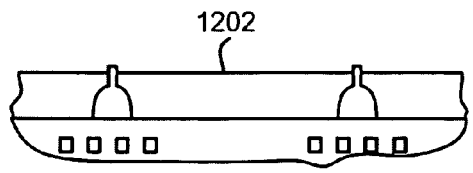
Figure 13C:
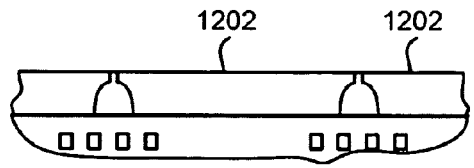

FIGS. 13A-C illustrate one method for forming a writer. Conventional processing may be used to form the various parts. Referring to FIG. 13A, first and second write coils 306, 308 are formed. First and second write gaps 302, 304 are also formed. Referring to FIG. 13B, material is deposited for concurrently forming write pole regions 1202, which may or may not be defined at this point. Referring to FIG. 13C, the structure is planarized.

Figure 14A:
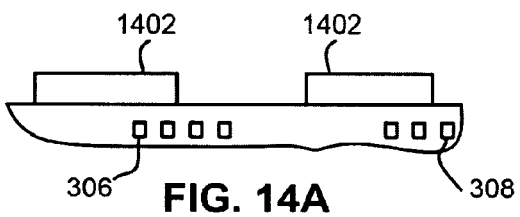
FIGS. 14A-C illustrate another method for forming a writer.
Figure 14B:
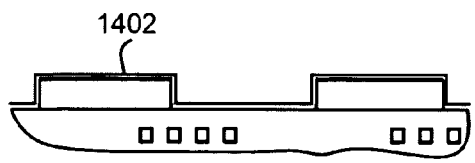
Figure 14C:
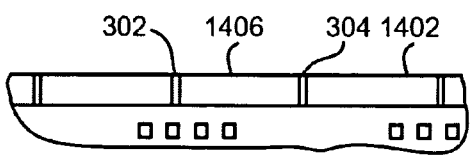

FIGS. 14A-C illustrate another method for forming a writer. Again, processing may be used to form the various parts. Referring to FIG. 14A, first and second write coils 306, 308 are formed. Write pole regions 1402 are also formed. Write gap material 1404 is formed over the write pole regions, as shown in FIG. 14B. Further processing may be performed prior to formation of a common write pole region 1406 adjacent first and second write gaps 302, 304, as shown in FIG. 14C.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A magnetic head, comprising:
   a pole;
   a first write gap in the pole;
   a first coil for generating a magnetic flux across the first write gap;
   a second write gap in the pole having at least a portion thereof aligned with the first write gap in a direction parallel to a direction of media travel thereover, and
   a second coil for generating a magnetic flux across the second write gap, the second coil being addressable independently of the first coil,
   wherein the first and second coils are formed on a common substrate, wherein each of the write gaps is straight along an entire length thereof in a direction parallel to a media facing side thereof.

2. A head as recited in claim 1, wherein a tape bearing surface of the head is planar.

3. A head as recited in claim 1, wherein a common region of the pole extends from the first write gap to the second write gap.

4. A head as recited in claim 1, wherein the first and second write gaps are oriented at an angle relative to each other of greater than 0 degrees and less than 180 degrees.

5. A head as recited in claim 1, wherein the first write gap is oriented at an angle of between about 2 and about 88 relative to the direction of media travel thereover.

6. A head as recited in claim 5, wherein the second write gap is oriented at an angle of between about 2 and about 88 relative to the direction of media travel thereover.

7. A head as recited in claim 1, wherein the second write gap is oriented at an angle about perpendicular to the direction of media travel thereover.

8. A head as recited in claim 1, wherein centers of the first and second write gaps are aligned in the direction of media travel thereover.

9. A head as recited in claim 1. Wherein centers of the first and second write gaps are offset from each other relative to the direction of media travel thereover in a direction perpendicular to the direction of media. travel thereover and parallel to a media facing surface of the head.

10. A head as recited in claim 1, further comprising a third write gap, the first coil also generating a magnetic flux across the third write gap.

11. A head as recited in claim 1, further comprising a fourth write gap, the second coil also generating a magnetic flux across the fourth write gap.

12. A tape drive system, comprising:
a magnetic head as recited in claim 1;
a drive mechanism for passing a magnetic recording tape over the head; and
a controller in communication with the head.

13. A magnetic head, comprising:
a pole;
a first write gap in the pole;
a first coil for generating a magnetic flux across the first write gap;
a second write gap in the pole having at least a portion thereof aligned with the first write gap in a direction parallel to a direction of media travel thereover;
a second coil for generating a magnetic flux across the second write gap. the second coil being addressable independently of the first coil: and
a third write gap having at least a portion thereof aligned with the first write gap in a direction parallel to the direction of media travel thereover; and a third coil for generating a magnetic fax across the third write gap and being addressable independently of the first and second coils.

14. A magnetic head, comprising:
a pole;
a first write gap in the pole:
a first coil for generating a magnetic flux across the first write gap;
a second write gap in the pole having at least a portion thereof aligned with the first write gap in a direction parallel to a direction of media travel thereover; and
a second coil for generating a magnetic flux across the second write gap, the second coil being addressable independently of the first coil,
wherein the write gaps extend to opposite edges of the pole.

15. A system, comprising:
a planar tape bearing surface;
a first write gap positioned such that a magnetic flux emanates thereacross out of the tape bearing surface;
a first coil for generating the magnetic flux across the first write gap, the first coil having portions of several turns aligned in a direction about parallel to a media facing surface;
a second write gap positioned such that a magnetic flux emanates thereacross out of the tape bearing surface, the second write gap having at least a portion thereof aligned with the first write gap in a direction parallel to a direction of media travel thereover, wherein a common pole region. extends from the first write gap to the second write gap and defines edges of the first and second write gaps;
a second coil for generating the magnetic flux across the second write gap, the second coil being addressable independently of the first coil, the second coil having portions of several turns aligned in a direction about parallel to a media facing surface;
wherein each of the write gaps is straight along an entire length thereof in a direction parallel to a media facing side thereof,
the first and second write gaps being oriented at an angle relative to each other of greater than 0 degrees and less than 180 degrees.

16. The system as recited in claim 15, further comprising:
a drive mechanism for passing a magnetic recording tape over the write gaps; and
a controller in communication with the coils.

* * * * *